Figure 5:
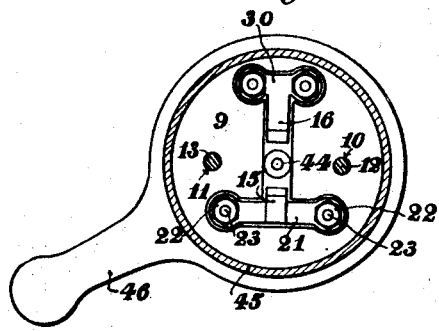

F. H. ALSTON.
ELECTRIC IGNITION SYSTEM OF INTERNAL COMBUSTION ENGINES.
APPLICATION FILED JAN. 24, 1910.
1,010,211.
Patented Nov. 28, 1911
4 SHEETS—SHEET 1.
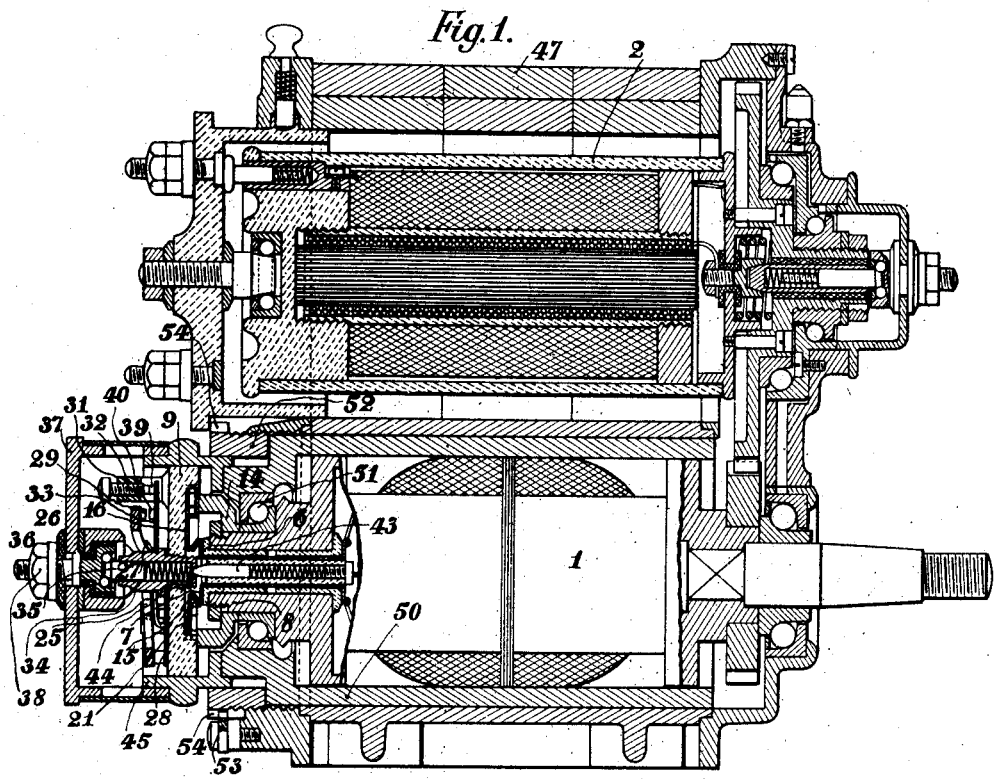
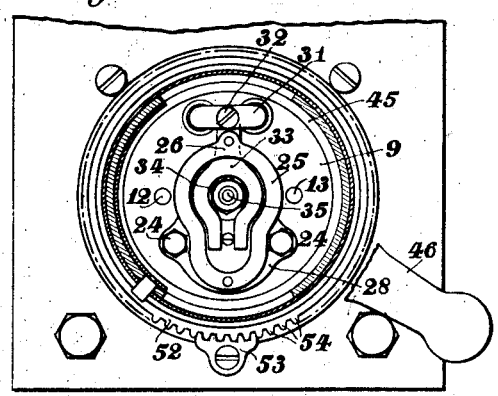
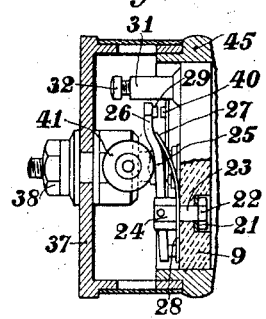
WITNESSES
INVENTOR Frank H. Alston
by James L. Norris
Atty F. H. ALSTON.
ELECTRIC IGNITION SYSTEM OF INTERNAL COMBUSTION ENGINES.
APPLICATION FILED JAN. 24, 1910.

1,010,211.

Patented Nov. 28, 1911.

4 SHEETS—SHEET 2.

WITNESSES

INVENTOR Frank H. Alston
By James L. Norris
Atty.

F. H. ALSTON.
ELECTRIC IGNITION SYSTEM OF INTERNAL COMBUSTION ENGINES.
APPLICATION FILED JAN. 24, 1910.

1,010,211.

Patented Nov. 28, 1911.

4 SHEETS—SHEET 3.

F. H. ALSTON.
ELECTRIC IGNITION SYSTEM OF INTERNAL COMBUSTION ENGINES.
APPLICATION FILED JAN. 24, 1910.

1,010,211.

Patented Nov. 28, 1911.
4 SHEETS—SHEET 4.

WITNESSES

INVENTOR  Frank H. Alston
By James L. Norris
Atty

UNITED STATES PATENT OFFICE.

FRANK HERBERT ALSTON, OF BIRMINGHAM, ENGLAND, ASSIGNOR OF ONE-HALF TO BOULTBEE BROOKS, OF BIRMINGHAM, ENGLAND.

ELECTRIC IGNITION SYSTEM OF INTERNAL-COMBUSTION ENGINES.

1,010,211.      Specification of Letters Patent.     Patented Nov. 28, 1911.

Application filed January 24, 1910. Serial No. 539,724.

*To all whom it may concern:*

Be it known that I, FRANK HERBERT ALSTON, subject of the King of Great Britain, residing at Birmingham, England, have invented certain new and useful Improvements in Electric Ignition Systems of Internal-Combustion Engines, of which the following is a specification.

This invention relates to high-tension ignition systems of internal combustion engines and has for its principal object to provide improved means for effecting a rapid change in the strength and direction of the magnetic field of the induction coil or high-tension transformer employed, so as to obtain a much hotter and better spark than that generally obtainable in ordinary ignition systems.

The two known methods of producing a spark are either to break the primary circuit, or else to complete said circuit by suddenly causing the current to pass therethrough after having been previously short-circuited, the result being, in each case, to change the strength of the magnetic field of the coil or transformer. According to the present invention these two methods are combined, and two branch circuits are provided through which the current is caused to pass alternately and in opposite directions by means of an automatically operated make and break means, it being arranged that when the current reaches its maximum value, the circuit through which the current previously passed is broken, and at the same instant, or immediately before or after, the other circuit is completed, it being so arranged that the current now passes through this second circuit in an opposite direction. The current passing through the primary winding of the coil or transformer is by this means suddenly reversed in direction, the suddenness of the change in the strength and direction of the magnetic field producing a very intense spark in the engine cylinder.

Another object of the invention is to provide in connection with a magneto-electric machine, improved means of the rocking pole type for insuring that the make-and-break or equivalent device shall be actuated when the current is at its maximum value, whether the ignition is advanced or retarded.

Figure 2:
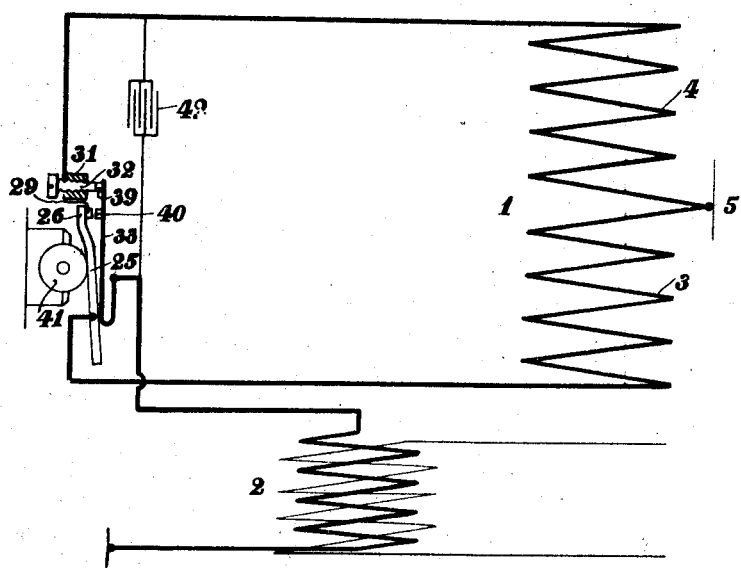
Figure 6:
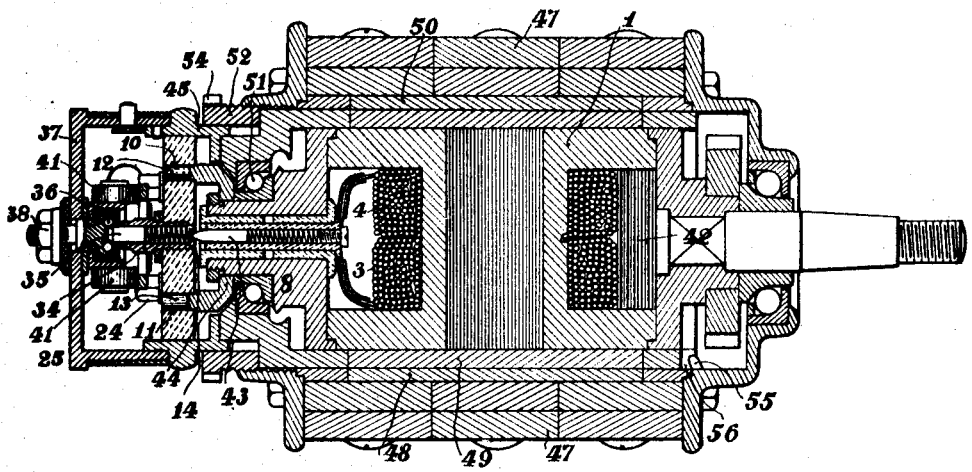
Figure 7:
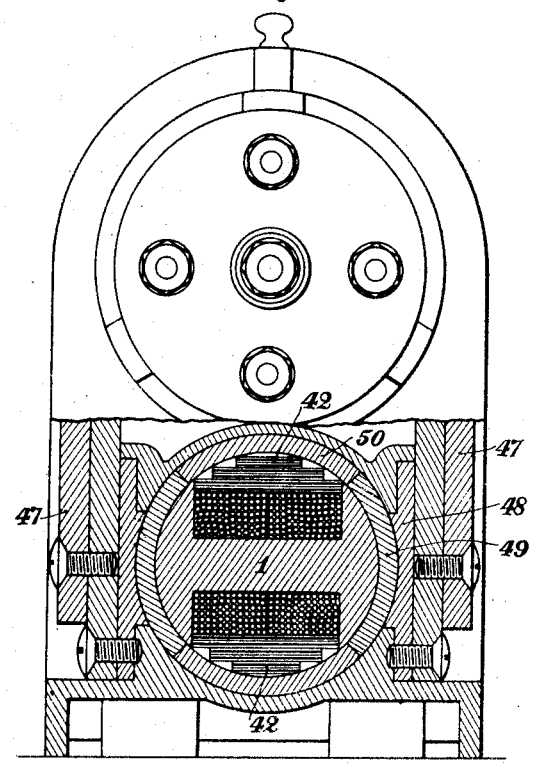

Figure 1 of the accompanying drawings represents a complete longitudinal section of a magneto-electric machine embodying the present invention, and arranged for use in connection with a four-cylinder engine. Fig. 2 shows diagrammatically the general arrangement of the system. Fig. 3 is a transverse section showing the make-and-break device in front elevation. Fig. 4 illustrates said make-and-break in side elevation, and Fig. 5 is a section showing the rear side or back face of the device. Fig. 6 represents a horizontal section through the armature of the machine. Fig. 7 is a part vertical section through the machine.

1 is the armature of the magneto machine, and 2 is the induction coil shown as being arranged within a chamber above the armature. The said armature is wound with two low tension windings 3, 4, one end of each of which is connected at 5, (see Fig. 2) to earth through the armature core and the frame, while the opposite ends are connected up to a special make-and-break device as hereafter described, whereby they are arranged to be alternately placed in series with the primary winding of the induction coil and external low tension circuit. The two windings of the armature are wound in the same direction, or in other words, there is practically a single winding having its middle point earthed to the mass of the armature, so that the current generated in half of the winding when the latter is in circuit will flow in a direction opposite to the remaining half of the winding when in circuit.

The change-over make-and-break which is automatically operated either mechanically by a cam on the magneto machine (or electro-magnetically) is so arranged that when the current in the one winding which is connected up with the coil reaches its maximum, contact is made so as to place the other winding in circuit and at the same time, or immediately after, the contact is broken so as to cut out the first mentioned winding. The current is now generated by the second winding and passes through the primary winding of the coil in the reverse direction, thus reversing the magnetic field, and causing an intense spark to be created.

In the arrangement shown, the live ends of the double windings 3, 4, of the armature 1 are connected to the insulated metallic terminal strips 6, 7, passing out through the one end of the spindle 8, the outer extremities being bent-up as shown. The make-and-break device is mounted upon a vulcanite base plate 9 adapted to be attached to the spindle 8 by a push-on connection, being provided for this purpose with a pair of holes 10, 11, which engage with a pair of diametrically opposite pins 12, 13, projecting from a ring or collar 14 fixed upon the spindle end. At the back of the base 9 are two spring contact pieces 15, 16, which engage with the live terminal ends 6, 7, of the windings.

The contact 15 is carried by a cross-bar 21 fixed at its opposite ends by nuts 22 screwing on to the inner sides of studs 23 between whose heads 24, at the front of the base 9, is pivoted a rocking frame or lever 25 formed with a forwardly projecting cam end 26. This end is acted upon by spring 27 formed by the free ends of a metallic frame 28 fixed in position by the stud heads 24. The inner face of the said cam end 26 carries a contact point 29, which thus forms the virtual live end of the one winding 3 of the armature. The contact piece 16 is carried by the cross-piece 30 connected to a bridge 31 mounted upon the front of the base, and carrying an adjustable contact screw 32 which forms the virtual live end of the other winding 4 of the armature. Behind the rocking member 25 is a spring tongue or lever 33 whose lower end is folded or bent up into a U-form and fixed to the center of the base by the hollow bush 34 which carries a spring plunger or brush 35 engaging with a ball-bearing contact 36 carried by the end of the detachable closure cap or cover 37, said contact being connected with an external terminal 38 from whence the current is conveyed to the primary winding of the induction coil. The spring tongue 33 carries at its outer free end two platinum or other contact points 39, 40, the former of which normally makes contact with the contact screw 32, while the other normally comes opposite to, but out of contact with, the contact point 29 on the rocking cam piece 25. Carried by the end of the closure cap 37 are a pair of diametrically opposite rollers 41, 41, which extend into the path traversed by the cam-end 26 of the rocking contact piece 25 when the armature revolves. During the time that said cam-end 26 is out of contact with the rollers 41, the contact points 39 on the spring tongue 33 (as above referred to) makes contact (under the influence of its spring) with the adjustable contact screw 32, so that the winding 4 of the armature is placed in series with the external circuit, the current passing first to contact piece 16, then to bridge 31, contact screw 32, spring tongue 33, central bush 34, plunger 35, contact 36, external terminal 38, and thence to the primary winding of the coil and to earth. At the moment the current generated by said armature winding 4 reaches its maximum value, one of the rollers 41 on the end cover engages and wipes over the cam end 26 of the rocking contact piece 25, the latter being depressed and caused to rock upon its fulcrum, so that its contact point 29 engages with the corresponding point 40 on the spring tongue 33. The second winding 3 of the coil is thus connected up with the external circuit, but the further movement of the rocking piece 25 presses back the spring tongue 33 so as to cause its contact point 39 to move away from the adjustable screw 32, thus breaking the circuit through the armature winding 4, but leaving the other winding in circuit. By this second winding, the current generated will flow through the induction coil in the opposite direction to that in which the current from the other winding was previously flowing.

The shape of the cam-end 26 of the rocking piece is such that the latter remains depressed until the current has reached its minimum value, when said end leaves the rollers and the winding 3 is cut out and contact remade to put the winding 4 into circuit. Owing to the breaking of the circuit with the winding 3 taking place when the current is at a minimum, the contact points 40, 29, between the rocking piece 25 and the spring tongue 33, need not be made of platinum, and it is only necessary to place a condenser 42 across the contact points for breaking contact with the winding 4, that is, between the adjustable contact screw 32 and the corresponding point 39 on the spring tongue. This condenser 42 is, as shown, preferably carried upon the armature of the machine so as to revolve therewith, and the side which is to be connected to the spring tongue 33 is connected through the armature spindle 8 to a central insulated terminal brush or plunger 43 at the extremity of said spindle, and which makes contact at the back of the base plate 9 of the make-and-break device, with the inner end 44 of the central bush 34 by which the said tongue 33 is fixed. The other side of the condenser is connected with the end or other part of the armature winding which is coupled up with the contact screw 32. Instead of causing the fixed rollers or the like to engage or wipe over the cam end of the rocking contact, a magnetically actuated means may be substituted in the form of a trembler operated in a well known manner.

In an alternative arrangement the breaking and making of the contacts may be reversed, that is to say, the rocking piece 25 may remain depressed until the maximum position is reached, when it is released, breaking the contact that was made in the previous case, and making that which was previously broken, it being understood that the condenser would be connected across the contact points which break the circuit when the current is at its maximum.

It is understood that it is not wished to confine the invention to the form of make-and-break device herein described, as any other device may be employed which cuts out the one winding when the current attains its maximum value, and complete the circuit through the other winding.

In order to advance or retard the ignition, the detachable casing 37 carrying the rollers 41, is secured to the rocking sleeve or chamber 45 provided with the timing lever 46, so that when this lever is turned the time of actuation of the make-and-break is varied accordingly. In order, however, to insure that the make-and-break shall be actuated when the current is at its maximum value, even when the ignition is advanced or retarded, the pole pieces of the magnets are arranged to be adjusted angularly in synchronism with the timing mechanism. Thus the magnets 47 are provided with short fixed pole pieces 48, and in conjunction with these, auxiliary rocking pole pieces 49 are employed, which moreover, but are always in direct contact with, said fixed poles. These rocking pole pieces 49 are let into the sides and form part of, a sleeve or shield 50 of brass or other non-magnetic material which surrounds the armature and which is capable of being turned around upon its axis through a certain angle. At the make-and-break end the sleeve 50 is attached by screws to the chamber 45, so that when the latter is rocked to advance or retard the ignition, the movable pole pieces 49 are rocked in synchronism and to the same extent, thus insuring that the make-and-break shall always be actuated when the armature is in its maximum position.

The sleeve or shield is inserted into position from one end, and rests upon the frame. At the outer end it carries the ball bearings 51 upon which the one end of the armature is supported, and the sleeve may be secured in position by an externally wormed ring or nut 52 which screws into a wormed opening at the open end of the machine, and which bears against the end of the sleeve so as to keep the bearings close up to the ball race on the armature spindle. The bearings can thus be adjusted by means of this ring. It may be locked in its adjusted position by a toothed segment 53 engaging with the teeth 54 around its periphery. Suitable stops may be provided for limiting the angular movement of the sleeve 50, such as by a pin 55 on the frame engaging within a gap in the inner end of said sleeve (see Fig. 6) or otherwise.

Instead of a magneto machine, a battery may be employed as the source of current.

Having fully described my invention, what I desire to claim and secure by Letters Patent is:—

1. In electric ignition systems of internal combustion engines, a magneto electric machine having an armature grounded in the middle to provide two windings, an induction coil structurally associated with the said armature windings, and an automatically operated device causing the current to pass in the same direction alternately through the said windings and to reverse the current through the induction coil.

2. In electric ignition systems of internal combustion engines, a magneto electric machine having an armature grounded in the middle to provide two low tension windings which are wound in the same direction, an automatically operated make and break device having one end of each of the said armature windings connected thereto, and an induction coil structurally associated with the make and break device, the windings of the armature of the magneto electric machine being alternately placed in series with the primary winding of the induction coil by the make and break device, the latter being arranged to break contact so as to cut out one winding and also to make contact so as to place the other winding in circuit, the current being reversed through the induction coil.

3. In electric ignition systems of internal combustion engines, a magneto electric machine having an armature grounded in the middle to provide two windings which are ground in the same direction, an automatically operated make and break device having one end of each of the windings connected up thereto, and an induction coil, the two windings of the armature of the magneto electric machine being alternately placed in series with the primary winding of the said induction coil by the make and break device, the latter being arranged to break contact to cut out one winding when the current generated thereby is at a maximum, and making contact to place the other winding in circuit, the current flowing through the induction coil in the reverse direction and reversing the magnetic field, the said second circuit being broken so as to again place the first winding in circuit when the current generated thereby is at its minimum value.

4. In an electric ignition system of internal combustion engines, two circuits arranged in parallel, a source of current, an induction coil associated with said circuits, an automatically operated device to cause the current to pass in the same direction alternately through said coil, said device comprising a spring influenced rocking member connected with one circuit, a stationary contact connected with the other circuit, and a spring influenced tongue or lever member carrying two contacts, one of the latter contacts normally engaging with the said stationary contact while the other of the two contacts is situated opposite to and normally separated from the rocking member, the automatic operation of the rocking member making contact with the tongue member and breaking contact between the said tongue member and the stationary contact.

5. In electric ignition systems of internal combustion engines, a magneto electric machine comprising an armature grounded in the middle to provide two windings thereon wound in the same direction, an automatically operated make and break device mounted to revolve with the armature, an induction coil having the primary winding thereof alternately placed in series with each of the two windings of the armature, the said make and break device, comprising a spring-influenced rocking member connected with one winding, a stationary contact connected with the other winding, and a spring-influenced tongue member carrying two contacts, one of the latter engaging the said stationary contact while the other is situated opposite to but normally separated from a contacting portion of the rocking member.

6. In electric ignition systems of internal combustion engines, a magneto electric machine comprising an armature grounded in the middle to provide two windings thereon wound in the same direction, a make and break device mounted to revolve with the armature, an induction coil having the primary winding thereof alternately placed in series with each of the two windings of the armature, the said make and break device comprising a spring-influenced rocking member connected with one winding, the rocking member having a contact consisting of a forwardly projecting cam end adapted to be engaged by projecting parts carried by a relatively stationary member, a stationary contact connected with the other winding, and a spring-influenced tongue member carrying two contacts, one of which normally engages with a stationary contact while the other is situated opposite to but normally separated from the contact of the rocking member, the projecting cam end of the rocking member operating to make contact with the tongue member and to break contact between the said tongue member and the stationary contact.

In testimony whereof I have hereunto set my hand in presence of two subscribing witnesses.

FRANK HERBERT ALSTON.

Witnesses:
HENRY SKERRETT,
HENRY NORTON SKERRETT.